US007428606B2

(12) United States Patent
Liu et al.

(10) Patent No.: US 7,428,606 B2
(45) Date of Patent: Sep. 23, 2008

(54) METHOD, SYSTEM AND APPARATUS TO ALLOW USERS TO REMOTELY MOUNT USB DEVICES AND ACCESS KVM THROUGH A SERVER INTERFACE POD (SIP)

(75) Inventors: Tong Liu, Austin, TX (US); Yung-Chin Fang, Austin, TX (US)

(73) Assignee: Dell Prodcuts L.P., Round Rock, TX (US)

( * ) Notice: Subject to any disclaimer, the term of this patent is extended or adjusted under 35 U.S.C. 154(b) by 162 days.

(21) Appl. No.: 11/418,888

(22) Filed: May 5, 2006

(65) Prior Publication Data

US 2008/0005414 A1    Jan. 3, 2008

(51) Int. Cl.
*G06F 13/12* (2006.01)
(52) U.S. Cl. .............................. 710/62; 710/63; 710/72
(58) Field of Classification Search ................... 710/62, 710/63, 72
See application file for complete search history.

(56) References Cited

U.S. PATENT DOCUMENTS

| | | | | |
|---|---|---|---|---|
| 6,378,014 B1 | 4/2002 | Shirley | ........................ | 710/100 |
| 6,567,869 B2 | 5/2003 | Shirley | ........................ | 710/62 |
| 6,615,272 B1 | 9/2003 | Ambrose | ..................... | 709/238 |
| 6,681,250 B1 | 1/2004 | Thomas et al. | .............. | 709/226 |
| 6,782,443 B2 | 8/2004 | Ferguson | ..................... | 710/313 |
| 6,915,362 B2 | 7/2005 | Ramsey et al. | ................ | 710/62 |
| 6,931,475 B2 | 8/2005 | Huang et al. | ................. | 710/316 |
| 6,961,798 B2 | 11/2005 | Ferguson | ..................... | 710/305 |
| 7,035,955 B2 | 4/2006 | Bobbitt et al. | ............. | 710/305 |
| 7,076,565 B2 | 7/2006 | Ambrose | ..................... | 709/238 |
| 2005/0105542 A1* | 5/2005 | Seki et al. | .................... | 370/402 |
| 2006/0104289 A1* | 5/2006 | Lee | ............................. | 370/400 |
| 2007/0101029 A1* | 5/2007 | Lee | ............................. | 710/72 |

* cited by examiner

*Primary Examiner*—Niketa I Patel
(74) *Attorney, Agent, or Firm*—Baker Botts L.L.P.

(57) ABSTRACT

A keyboard, video monitor and mouse (KVM) Universal Serial Bus (USB) Internet protocol (IP) server interface pod (SIP) allows access to selected ones of a plurality of servers by a remotely located keyboard, video monitor and mouse. In addition, remote mounting of a USB device to the selected server is also possible. A digital KVM USB switch may be used for routing the remotely located keyboard, video monitor, mouse and USB device to the KVM USB IP SIP. The digital KVM USB switch also is coupled to a KVM USB IP interface. The KVM USB IP interface is located with and connected to the remotely located keyboard, video monitor, mouse and USB device. The KVM USB IP interface may be coupled to the digital KVM USB switch over a local area network (LAN), wide area network (WAN), or Internet.

36 Claims, 5 Drawing Sheets

Figure 2 (Prior Technology)

METHOD, SYSTEM AND APPARATUS TO ALLOW USERS TO REMOTELY MOUNT USB DEVICES AND ACCESS KVM THROUGH A SERVER INTERFACE POD (SIP)

TECHNICAL FIELD

The present disclosure relates generally to information handling systems and, more particularly, for remote access and remote mounting of Universal Serial Bus (USB) devices to servers in an information handling system.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, multiple disk system and telecommunications switch.

In large a scale data center having many servers, remote access of each these servers is required. A server interface pod (SIP) has become widely accepted for facilitating keyboard, video monitor and mouse (KVM) remote access to each of the servers. Use of a KVM SIP avoids having to physically walk to each server and plug-in or otherwise locally connect a keyboard, video monitor, and mouse to a server that requires administrator access.

SUMMARY

Since present technology KVM SIPs only allow keyboard, video monitor and mouse remote access to each server in an information handling system, an administrator and/or technician still has to locally mount (i.e., connect) to a selected server a Universal Serial Bus (USB) device, e.g., CDROM, digital versatile disc or digital video disc (DVD), removable non-volatile memory (e.g., memory stick, tape, hard disc), etc., when required. What is needed is a KVM USB Internet protocol (IP) SIP that would allow remote mounting of a USB device to a selected server in addition to remote access of the selected server with a keyboard, video monitor and mouse.

According to a specific example embodiment of this disclosure, an apparatus for coupling a remotely located keyboard, video monitor, mouse and USB device to any one of a plurality of servers in an information handling system may comprise: a keyboard, video monitor, mouse (KVM) Universal Serial Bus (USB) Internet Protocol (IP) remote device having interfaces for coupling to a keyboard, a video monitor, a mouse, a USB device, and an IP Ethernet fabric; a plurality of server interface pods (SIPs), wherein each of the plurality of SIPs have interfaces for coupling to a server keyboard interface, a server video monitor interface, a server mouse interface, a USB interface, and the IP Ethernet fabric; and a digital KVM USB switch comprising a plurality of IP Ethernet fabric interfaces, wherein the IP Ethernet fabric interface of the KVM USB IP remote device is coupled to one of the plurality of IP Ethernet fabric interfaces of the digital KVM USB switch and each of the plurality of SIPs IP Ethernet fabric interfaces is coupled to a respective one of the plurality of IP Ethernet fabric interfaces of the digital KVM USB switch; wherein the digital KVM USB switch selects which one of the plurality of SIPs is coupled to the KVM USB IP remote device such that the server coupled to the selected one of the plurality of SIPs is remotely controlled by the keyboard, the video monitor and the mouse, and a USB device that is coupled to the USB interface of the KVM USB IP remote device is mounted to the server coupled to the selected one of the plurality of SIPs.

According to another specific example embodiment of this disclosure, an information handling system having a plurality of servers and remote control of those plurality of servers may comprise: a keyboard, video monitor, mouse (KVM) Universal Serial Bus (USB) Internet Protocol (IP) remote device having interfaces for coupling to a keyboard, a video monitor, a mouse, a USB device, and an IP Ethernet fabric; a plurality of server interface pods (SIPs), wherein each of the plurality of SIPs have interfaces for coupling to a server keyboard interface, a server video monitor interface, a server mouse interface, a USB interface, and the IP Ethernet fabric; and a digital KVM USB switch comprising a plurality of IP Ethernet fabric interfaces, wherein the IP Ethernet fabric interface of the KVM USB IP remote device is coupled to one of the plurality of IP Ethernet fabric interfaces of the digital KVM USB switch and each of the plurality of SIPs IP Ethernet fabric interfaces is coupled to a respective one of the plurality of IP Ethernet fabric interfaces of the digital KVM USB switch; wherein the digital KVM USB switch selects which one of the plurality of SIPs is coupled to the KVM USB IP remote device such that a respective one of the plurality of servers coupled to the selected one of the plurality of SIPs is remotely controlled by a keyboard, a video monitor and a mouse, and a USB device that is coupled to the USB interface of the KVM USB IP remote device is mounted to the respective one of the plurality of servers coupled to the selected one of the plurality of SIPs.

According to yet another specific example embodiment of this disclosure, a method for coupling a remotely located keyboard, video monitor, mouse and USB device to any one of a plurality of servers in an information handling system may comprise the steps of: coupling a keyboard, video monitor, mouse (KVM) Universal Serial Bus (USB) Internet Protocol (IP) remote device to a keyboard, a video monitor, a mouse, a USB device, and an IP Ethernet fabric; coupling a plurality of server interface pods (SIPs) to respective ones of a plurality of servers in an information handling system; and coupling a digital KVM USB switch to each of the plurality of SIPs and the KVM USB IP remote device through the IP Ethernet fabric; wherein the digital KVM USB switch comprises the step of selecting which one of the plurality of SIPs is coupled to the KVM USB IP remote device such that the server coupled to the selected one of the plurality of SIPs is remotely controlled by the keyboard, the video monitor and the mouse, and a remote USB device coupled to the KVM USB IP remote device is mounted to the server coupled to the selected one of the plurality of SIPs.

BRIEF DESCRIPTION OF THE DRAWINGS

A more complete understanding of the present disclosure thereof may be acquired by referring to the following description taken in conjunction with the accompanying drawings wherein.

Figure 1:
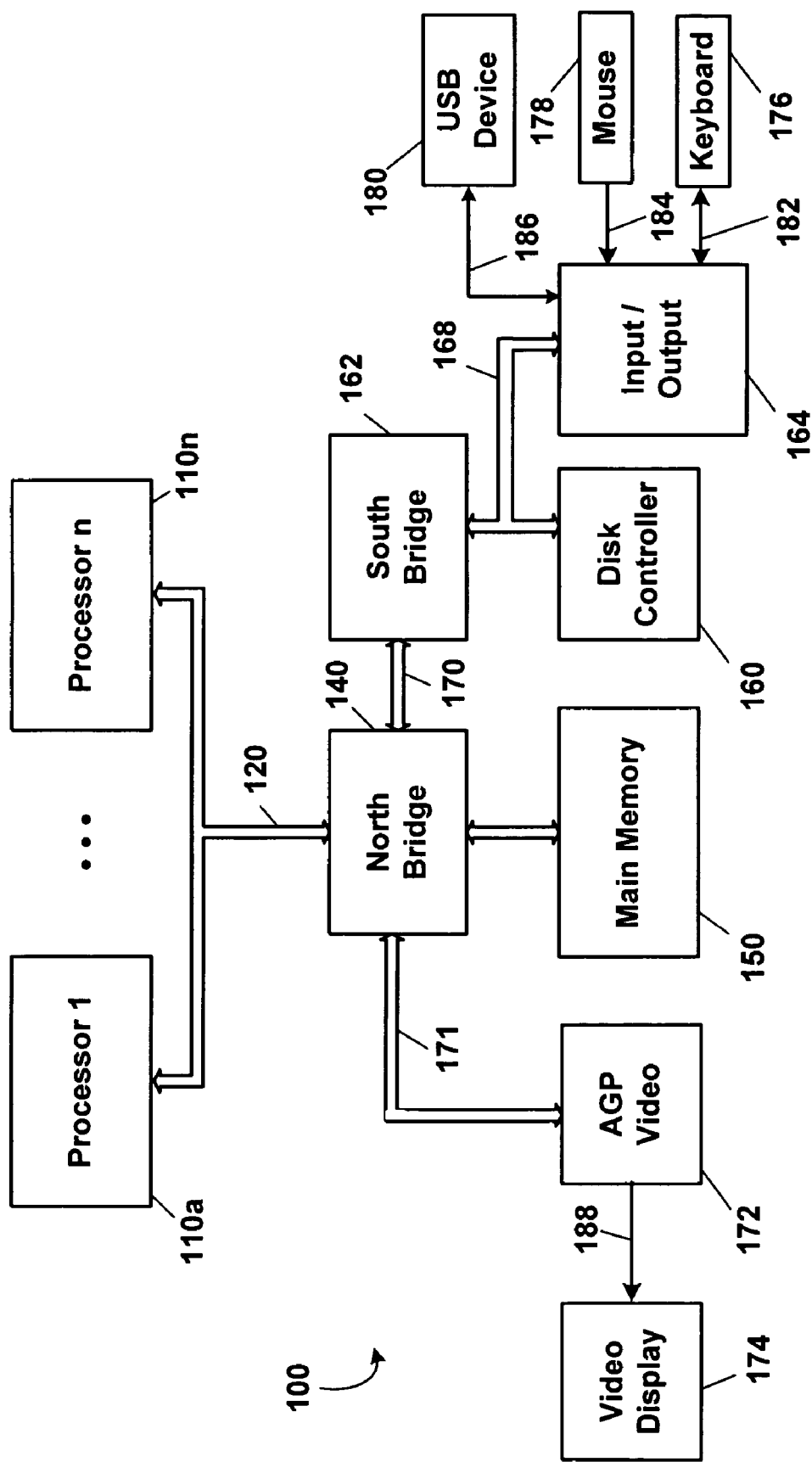
FIG. 1 is a schematic block diagram of a typical computer server in an information handling system.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disc drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of a typical computer server in an information handling system having electronic components mounted on at least one printed circuit board (PCB) (motherboard) and communicating data and control signals therebetween over signal buses. The server of the information handling system is generally referenced by the numeral 100. The server 100 may comprise: A processor(s) 110 coupled to a host bus(es) 120. A north bridge 140, which may also be referred to as a memory controller hub or a memory controller, is coupled to a main system memory 150. The north bridge 140 is coupled to the system processor(s) 110 via the host bus(es) 120. The north bridge 140 is generally considered an application specific chip set that provides connectivity to various buses, and integrates other system functions such as a memory interface. For example, an Intel 820E and/or 815E chip set, available from the Intel Corporation of Santa Clara, California, provides at least a portion of the north bridge 140. The chip set may also be packaged as an application specific integrated circuit (ASIC). The north bridge 140 typically includes functionality to couple the main system memory 150 to other devices within the server 100. Thus, memory controller functions such as main memory control functions typically reside in the north bridge 140. In addition, the north bridge 140 provides bus control to handle transfers between the host bus 120 and a second bus(es), e.g., PCI bus 170, and AGP bus 171. The AGP bus 171 may be coupled to a video graphics interface 172 which drives a video display 174. A second bus(es) 168 may also comprise other industry standard buses or proprietary buses, e.g., ISA, SCSI, USB buses through a south bridge(s) (bus interface) 162. A hard disc controller 160 may be coupled to one of these buses 168. Other input-output (I/O) interfaces 164 may be coupled to the south bridge 162 via the bus(es) 168. A mouse 178, a keyboard 176 and/or a USB device 180 may be coupled to appropriate I/O interfaces 164. The USB device 180 may be a CDROM, a memory stick, etc.

Figure 2:
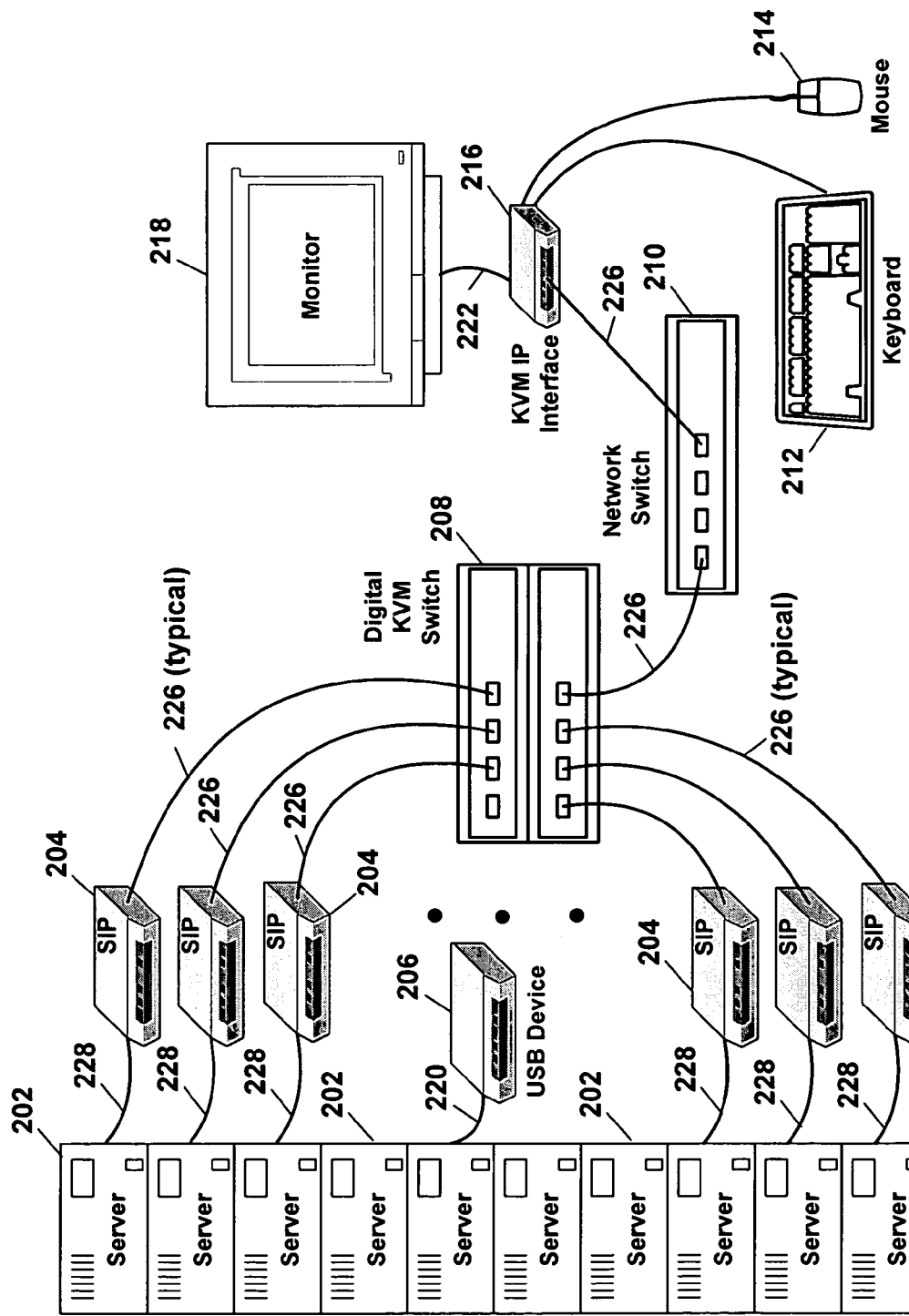
FIG. 2 is a schematic block diagram of a prior technology server interface pod (SIP) and management interface connected to a plurality of servers in an information handling system.

Referring now to FIG. 2, depicted is a schematic block diagram of a prior technology server interface pod (SIP) and management interface connected to a plurality of servers in an information handling system. A plurality of servers 202 may be remotely accessed by a user, technician and/or administrator with a remotely located keyboard 212, video monitor 218 and mouse 214 using a KVM Internet protocol (IP) interface 216. The video monitor 218 may be connected to the KVM IP interface 216 with a standard video cable 222. The mouse 214 and keyboard 212 may also be connected to the KVM IP interface 216. The KVM IP interface 216 may be coupled to a network switch 210 with an Ethernet cable 226. The network switch 210 may be coupled to a digital KVM switch 208 with another Ethernet cable 226. A plurality of server interface pods (SIPs) 204 may be coupled to the digital KVM switch 208 with other Ethernet cables 226. Each of the plurality of SIPs 204 may be coupled to a respective one of the plurality of servers 202 with a combination cable harness 228 comprising appropriate cabling for the video monitor interface, keyboard and mouse ports of each respective server 202. Using the aforementioned hardware configuration, a user, technician and/or administrator may access each of the plurality of servers 202 with the remotely located video monitor 218, keyboard 212 and mouse 214. However, a problem exists in that a USB device 206 must still be locally connected to an individual server 202 with a USB cable 220.

Figure 3:
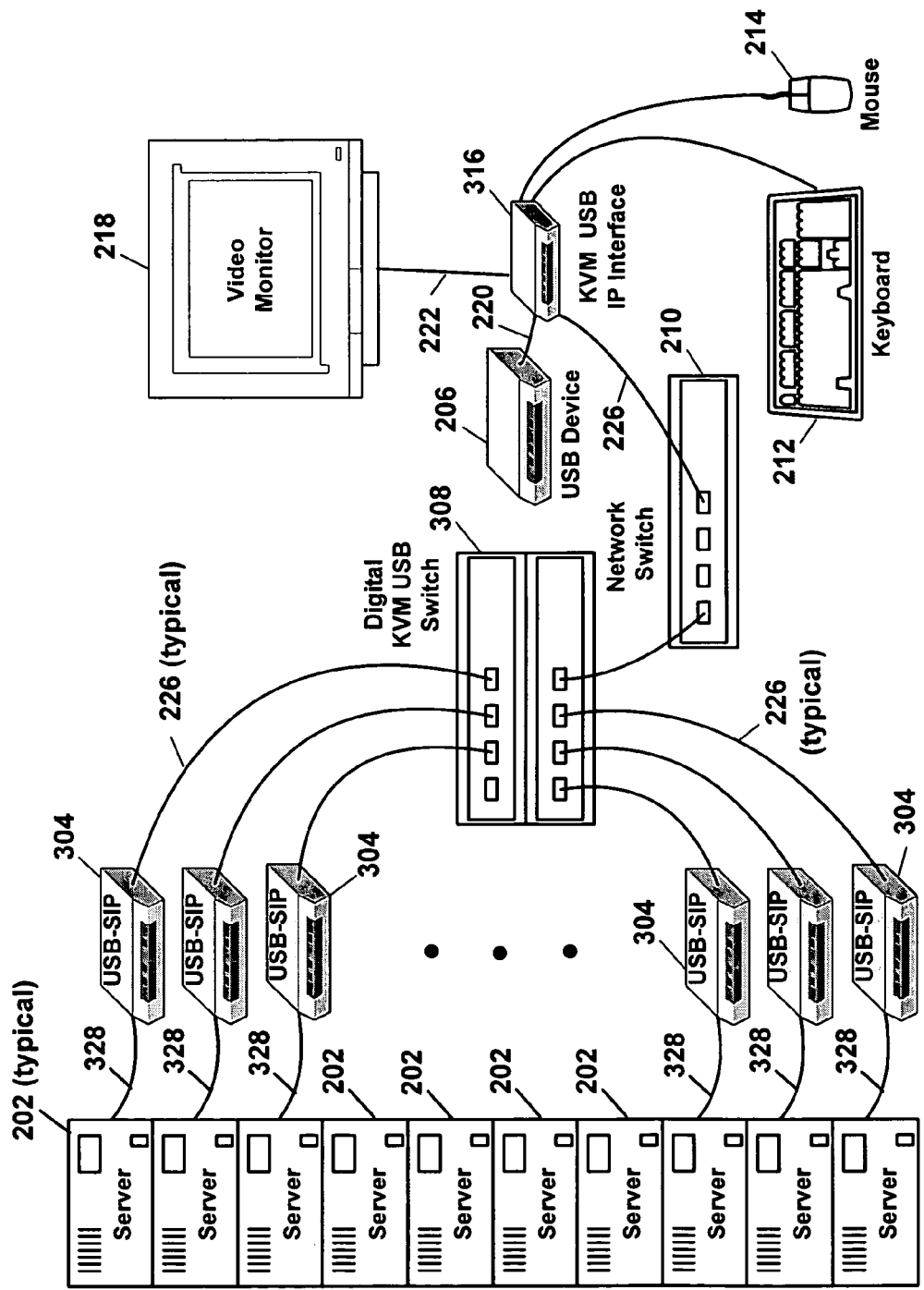
FIG. 3 is a schematic block diagram of a USB server interface pod (SIP) and management interface connected to a plurality of servers in an information handling system, according to a specific example embodiment of the present disclosure.

Referring to FIG. 3, depicted is a schematic block diagram of a USB server interface pod (SIP) and management interface connected to a plurality of servers in an information handling system, according to a specific example embodiment of the present disclosure. The plurality of servers 202 may be remotely accessed by a user, technician and/or administrator with a remotely located keyboard 212, video monitor 218 and mouse 214 using a KVM USB Internet protocol (IP) interface 316. The video monitor 218 may be connected to the KVM USB IP interface 316 with a standard video cable 222. The mouse 214 and keyboard 212 may also be connected to the KVM IP USB interface 316. A USB device 206 may be connected to the KVM USB IP interface 316 with a standard USB cable 220. The KVM USB IP interface 316 may be coupled to an Ethernet type fabric, e.g., network switch 210 with an Ethernet cable 226. The network switch 210 may be coupled to a digital KVM USB switch 308 with another Ethernet cable 226. A plurality of USB compatible server interface pods (USB-SIPs) 304 may be coupled to the digital KVM USB switch 308 with other Ethernet cables 226. Each of the plurality of USB-SIPs 304 may be coupled to a respective one of the plurality of servers 202 with a combination cable harness 328 comprising appropriate cabling for the video monitor interface, keyboard port, mouse port and a USB port of each respective server 202. Using the aforementioned hardware configuration, a user, technician and/or administrator may access each of the plurality of servers 202 with the remotely located video monitor 218, keyboard 212 and mouse 214. In addition, a USB device 206 may now be located with the keyboard 212, video monitor 218 and mouse 214 at the remote user/technician/administrator location, and conveniently mounted to a desired one of the plurality of servers 202.

The KVM USB IP interface 316 may add USB packets to the existing packets used for operation of the video monitor 218, keyboard 212 and mouse 214. These combination of KVM and USB packets may be routed through the network switch 210 to the digital KVM USB switch 308 and then to the respective ones of the plurality of USB-SIPs 304. The digital KVM USB switch 308 may direct which one of the plurality of USB-SIPs 304 is coupled to the remotely located video monitor 218, keyboard 212, mouse 214 and USB device 206. By doing so the server 202 coupled to that one of the plurality of USB-SIPs 304 is thereby controlled remotely and a remotely located USB device 206 may be mounted thereto.

This provides a completely transparent connection to any selected server in a data center information handling system by allowing the remotely located user to operate the keyboard 212, video monitor 218, mouse 214 and USB device 206, for example, across the digital KVM USB switch fabric, a local area network (LAN), a wide area network (WAN) or even over the Internet. Whenever the user may switch to a different server 202 via the digital KVM USB switch 308, the user located USB device 206 may also be redirected (e.g., mounted) to that server 202. This provides benefits to information handling system data centers with high server density as follows: 1) A single console box with KVM control and a virtual USB device for all servers. 2) Full server access and control capabilities from any convenient location and at any time. 3) Reliability, low cost, low maintenance and easy installation. And 4) reduced administrator/technician travel time so as to further reduce total cost of ownership (TCO).

Figure 4B:
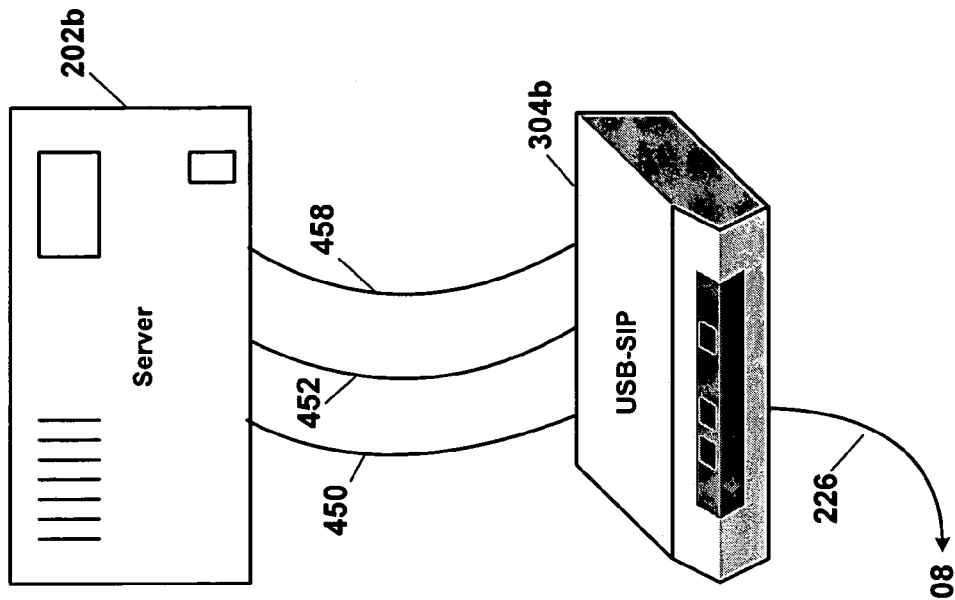
FIG. 4*b* is a more detailed schematic block diagram of a SIP shown in FIG. 3 coupled to a USB keyboard-mouse type server, according to a specific example embodiment of the present disclosure.
Figure 4A:
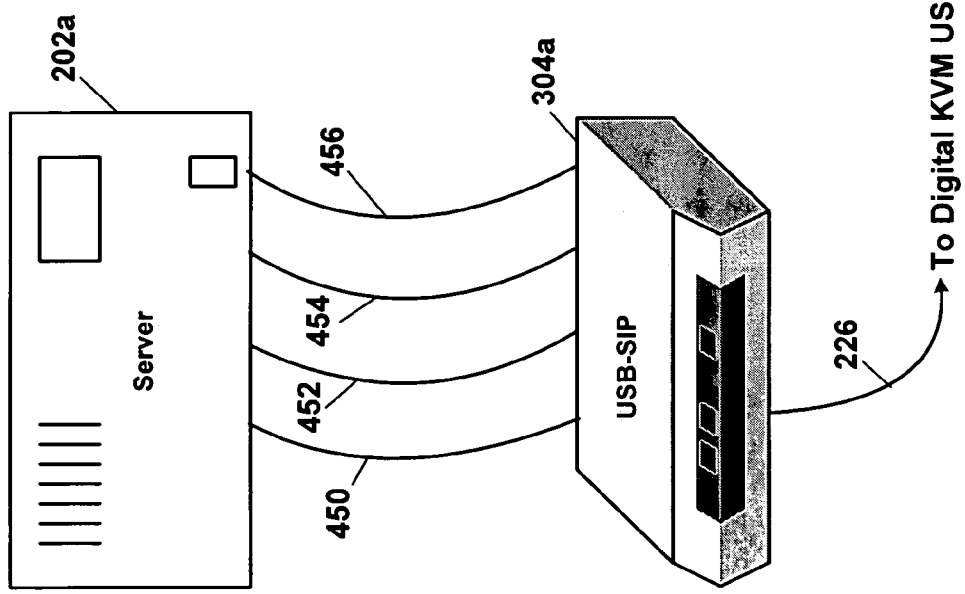
FIG. 4*a* is a more detailed schematic block diagram of a USB SIP shown in FIG. 3 coupled to a PS/2 keyboard-mouse type server, according to a specific example embodiment of the present disclosure.

Referring to FIG. 4a, depicted is a more detailed schematic block diagram of a USB SIP shown in FIG. 3 coupled to a PS/2 keyboard-mouse type server, according to a specific example embodiment of the present disclosure. The USB-SIP 304a may be connected to the server 202a with a standard video cable 450, a standard USB cable 452, a PS/2 style keyboard cable 454 and a PS/2 style mouse cable 456. The USB-SIP 304a is also connected to the digital KVM USB switch 308 with an Ethernet cable 226.

Referring to FIG. 4b, depicted is a more detailed schematic block diagram of a USB SIP shown in FIG. 3 coupled to a USB keyboard-mouse type server, according to a specific example embodiment of the present disclosure. The USB-SIP 304b may be connected to the server 202b with a standard video cable 450, a standard USB cable 452, and a USB cable 458 (server is configured for a USB keyboard and mouse). The USB-SIP 304b is also connected to the digital KVM USB switch 308 with an Ethernet cable 226.

Figure 5:
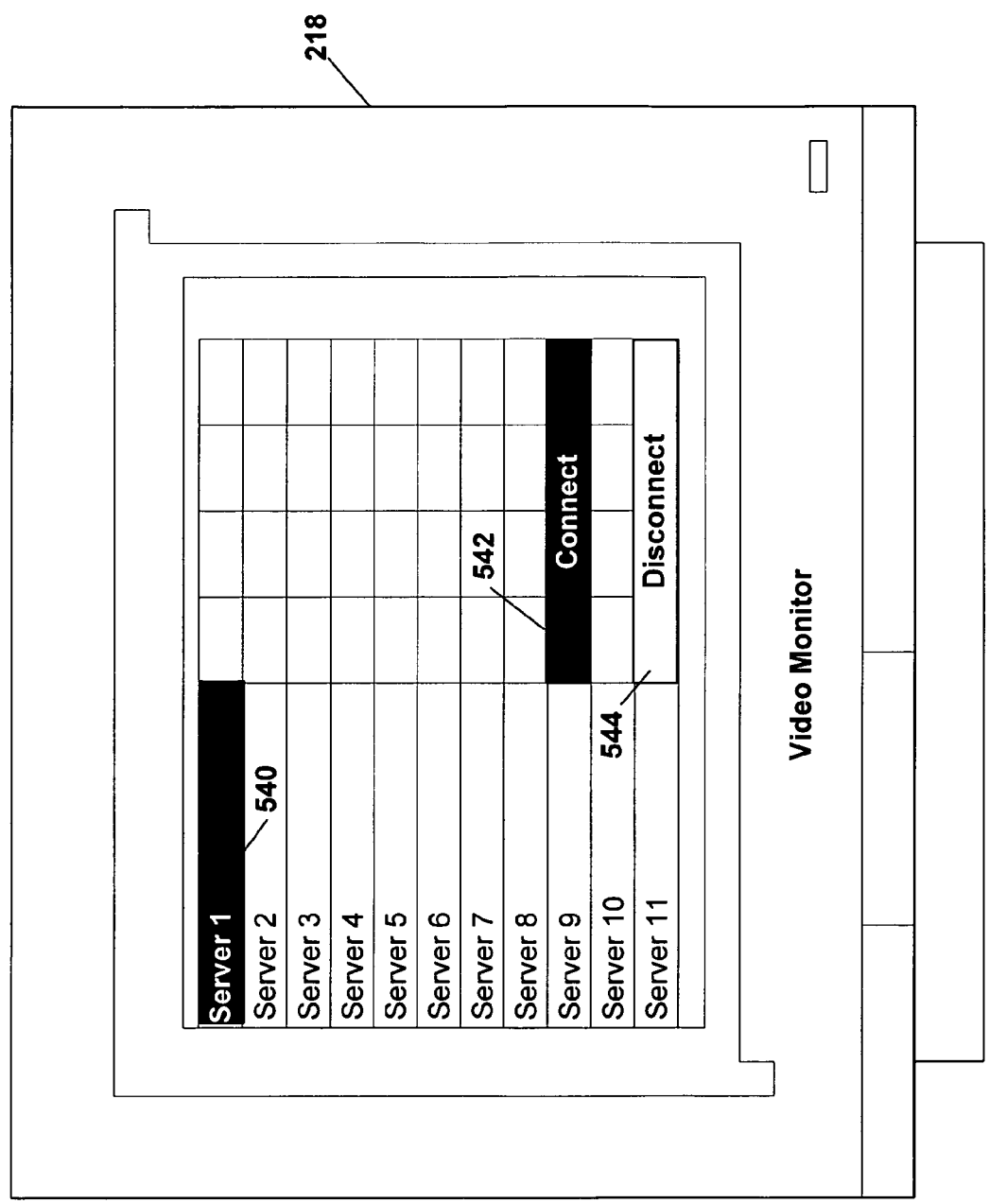
FIG. 5 is a schematic front view of a video monitor showing a control screen for the KVM USB SIP, according to a specific example embodiment of the present disclosure.

Referring to FIG. 5, depicted is a schematic front view of a video monitor showing a control screen for the KVM USB SIP, according to a specific example embodiment of the present disclosure. An operator may select which one of the plurality of servers 202 to access with the keyboard 212, video monitor 218, mouse 214 and USB device 206 by selecting from a menu of servers 540 and then selecting connection 542 thereto with the mouse 214 and/or keyboard 212. The server may also be disconnected from the keyboard 212, video monitor 218, mouse 214 and USB device 206 by deselecting 544 with the mouse 214 and/or keyboard 212. Thus, all normal maintenance, trouble shooting, program upgrades, etc., may easily and economically be performed at a site convenient to the user/administrator/technician.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An apparatus for coupling a remotely located keyboard, video monitor, mouse and USB device to any one of a plurality of servers in an information handling system, said apparatus comprising:
   a keyboard, video monitor, mouse (KVM) Universal Serial Bus (USB) Internet Protocol (IP) remote device having interfaces for coupling to a keyboard, a video monitor, a mouse, a USB device, and an IP Ethernet fabric;
   a plurality of server interface pods (SIPs), wherein each of the plurality of SIPs have interfaces for coupling to a server keyboard interface, a server video monitor interface, a server mouse interface, a USB interface, and the IP Ethernet fabric; and
   a digital KVM USB switch comprising a plurality of IP Ethernet fabric interfaces, wherein the IP Ethernet fabric interface of the KVM USB IP remote device is coupled to one of the plurality of IP Ethernet fabric interfaces of the digital KVM USB switch and each of the plurality of SIPs IP Ethernet fabric interfaces is coupled to a respective one of the plurality of IP Ethernet fabric interfaces of the digital KVM USB switch;
   wherein the digital KVM USB switch selects which one of the plurality of SIPs is coupled to the KVM USB IP remote device such that
      the server coupled to the selected one of the plurality of SIPs is remotely controlled by the keyboard, the video monitor and the mouse, and a USB device that is coupled to the USB interface of the KVM USB IP remote device is mounted to the server coupled to the selected one of the plurality of SIPs.

2. The apparatus according to claim 1, further comprising a network switch coupled between the KVM USB IP remote device and the digital KVM USB switch.

3. The apparatus according to claim 1, wherein the USB device is a compact disc read only memory (CDROM) drive.

4. The apparatus according to claim 1, wherein the USB device is a removable non-volatile memory.

5. The apparatus according to claim 4, wherein the removable non-volatile memory is a memory stick.

6. The apparatus according to claim 1, wherein the IP Ethernet fabric between the KVM USB IP remote device and the digital KVM USB switch is a local area network (LAN).

7. The apparatus according to claim 1, wherein the IP Ethernet fabric between the KVM USB IP remote device and the digital KVM USB switch is a wide area network (WAN).

8. The apparatus according to claim 1, wherein the IP Ethernet fabric between the KVM USB IP remote device and the digital KVM USB switch is an Internet.

9. The apparatus according to claim 1, wherein the keyboard and mouse interfaces are PS/2 keyboard and mouse interfaces.

10. The apparatus according to claim 1, wherein the keyboard and mouse interfaces are USB keyboard and mouse interfaces.

11. The apparatus according to claim 10, wherein the USB mouse is coupled to the USB keyboard and USB keyboard is coupled to a second USB interface of the KVM USB IP remote device.

12. The apparatus according to claim 1, wherein the selected one of the plurality of SIPs is determined with a control screen of the video monitor.

13. The apparatus according to claim 12, wherein the selected one of the plurality of SIPs is selected with the mouse controlling a cursor of the control screen on the video monitor.

14. The apparatus according to claim 12, wherein the selected one of the plurality of SIPs is selected with the keyboard controlling a cursor of the control screen on the video monitor.

15. An information handling system having a plurality of servers and remote control of those plurality of servers, said system comprising:
   a keyboard, video monitor, mouse (KVM) Universal Serial Bus (USB) Internet Protocol (IP) remote device having interfaces for coupling to a keyboard, a video monitor, a mouse, a USB device, and an IP Ethernet fabric;
   a plurality of server interface pods (SIPs), wherein each of the plurality of SIPs have interfaces for coupling to a server keyboard interface, a server video monitor interface, a server mouse interface, a USB interface, and the IP Ethernet fabric; and
   a digital KVM USB switch comprising a plurality of IP Ethernet fabric interfaces, wherein the IP Ethernet fabric interface of the KVM USB IP remote device is coupled to one of the plurality of IP Ethernet fabric interfaces of the digital KVM USB switch and each of the plurality of SIPs IP Ethernet fabric interfaces is coupled to a respective one of the plurality of IP Ethernet fabric interfaces of the digital KVM USB switch;
   wherein the digital KVM USB switch selects which one of the plurality of SIPs is coupled to the KVM USB IP remote device such that
      a respective one of the plurality of servers coupled to the selected one of the plurality of SIPs is remotely controlled by a keyboard, a video monitor and a mouse, and
      a USB device that is coupled to the USB interface of the KVM USB IP remote device is mounted to the respective one of the plurality of servers coupled to the selected one of the plurality of SIPs.

16. The system according to claim 15, further comprising a network switch coupled between the KVM USB IP remote device and the digital KVM USB switch.

17. The system according to claim 15, wherein the USB device is a compact disc read only memory (CDROM) drive.

18. The system according to claim 15, wherein the USB device is a removable non-volatile memory.

19. The system according to claim 18, wherein the removable non-volatile memory is a memory stick.

20. The system according to claim 15, wherein the IP Ethernet fabric between the KVM USB IP remote device and the digital KVM USB switch is a local area network (LAN).

21. The system according to claim 15, wherein the IP Ethernet fabric between the KVM USB IP remote device and the digital KVM USB switch is a wide area network (WAN).

22. The system according to claim 15, wherein the IP Ethernet fabric between the KVM USB IP remote device and the digital KVM USB switch is an Internet.

23. The system according to claim 15, wherein the keyboard and mouse interfaces are PS/2 keyboard and mouse interfaces.

24. The system according to claim 15, wherein the keyboard and mouse interfaces are USB keyboard and mouse interfaces.

25. The system according to claim 24, wherein the USB mouse is coupled to the USB keyboard and USB keyboard is coupled to a second USB interface of the KVM USB IP remote device.

26. The system according to claim 15, wherein the selected one of the plurality of SIPs is determined with a control screen of the video monitor.

27. The system according to claim 26, wherein the selected one of the plurality of SIPs is selected with the mouse controlling a cursor of the control screen on the video monitor.

28. The system according to claim 26, wherein the selected one of the plurality of SIPs is selected with the keyboard controlling a cursor of the control screen on the video monitor.

29. A method for coupling a remotely located keyboard, video monitor, mouse and USB device to any one of a plurality of servers in an information handling system, said method comprising the steps of:
   coupling a keyboard, video monitor, mouse (KVM) Universal Serial Bus (USB) Internet Protocol (IP) remote device to a keyboard, a video monitor, a mouse, a USB device, and an IP Ethernet fabric;
   coupling a plurality of server interface pods (SIPs) to respective ones of a plurality of servers in an information handling system; and
   coupling a digital KVM USB switch to each of the plurality of SIPs and the KVM USB IP remote device through the IP Ethernet fabric;
   wherein the digital KVM USB switch comprises the step of selecting which one of the plurality of SIPs is coupled to the KVM USB IP remote device such that
      the server coupled to the selected one of the plurality of SIPs is remotely controlled by the keyboard, the video monitor and the mouse, and a remote USB device coupled to the KVM USB IP remote device is mounted to the server coupled to the selected one of the plurality of SIPs.

30. The method according to claim 29, further comprising the step of coupling a network switch between the KVM USB IP remote device and the digital KVM USB switch through the IP Ethernet fabric.

31. The method according to claim 29, wherein the IP Ethernet fabric between the KVM USB IP remote device and the digital KVM USB switch is a local area network (LAN).

32. The method according to claim 29, wherein the IP Ethernet fabric between the KVM USB IP remote device and the digital KVM USB switch is a wide area network (WAN).

33. The method according to claim 29, wherein the IP Ethernet fabric between the KVM USB IP remote device and the digital KVM USB switch is an Internet.

34. The method according to claim 29, further comprising the step of selecting one of the plurality of SIPs with a control screen of the video monitor.

35. The method according to claim 34, wherein the step of selected one of the plurality of SIPs further comprises the step of selecting with the mouse controlling a cursor of the control screen on the video monitor.

36. The method according to claim 34, wherein the step of selected one of the plurality of SIPs further comprises the step of selecting with the keyboard controlling a cursor of the control screen on the video monitor.

* * * * *